UNITED STATES PATENT OFFICE.

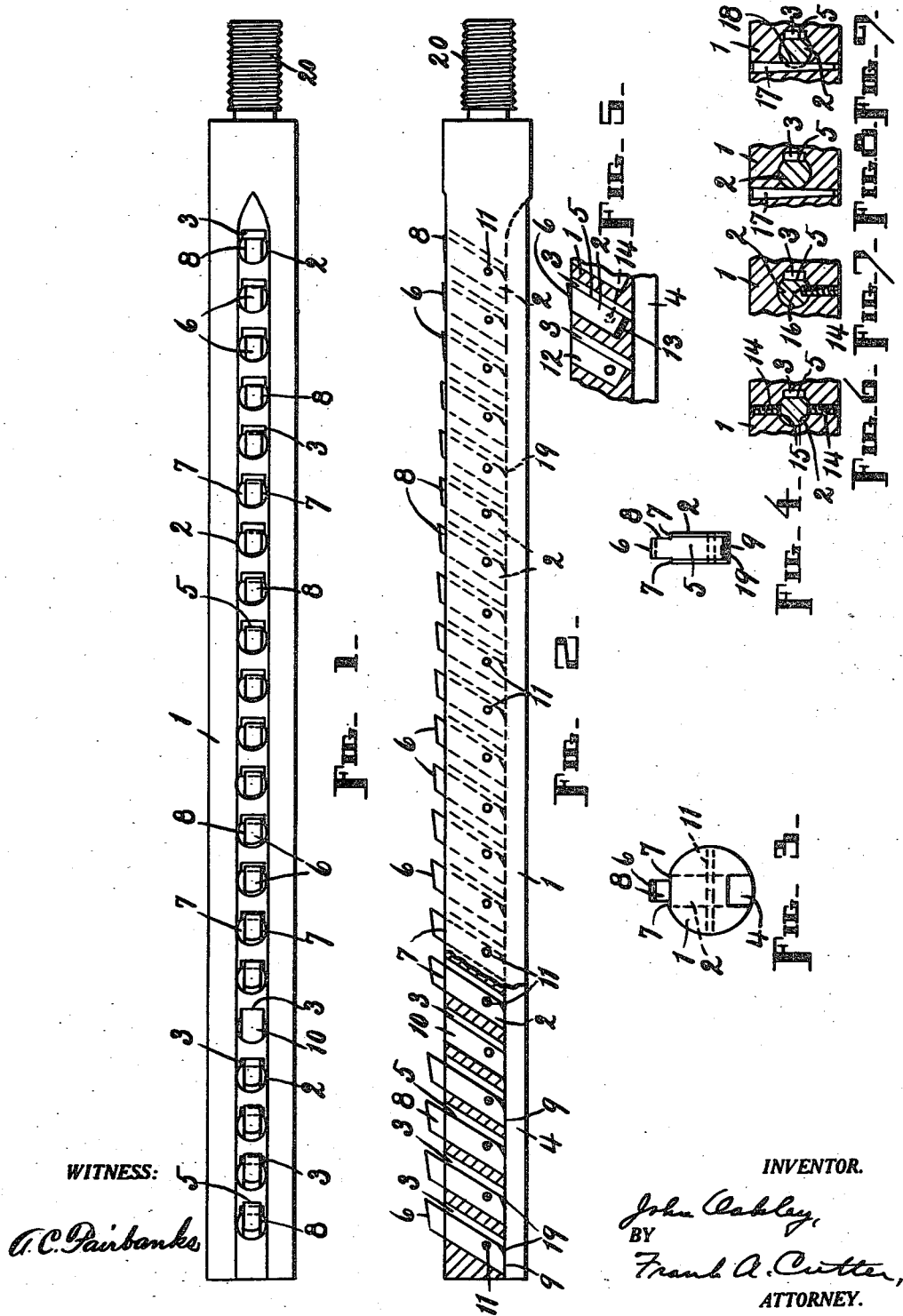

JOHN OAKLEY, OF SPRINGFIELD, MASSACHUSETTS.

BROACH.

1,272,841.   Specification of Letters Patent.   Patented July 16, 1918.

Application filed August 8, 1917. Serial No. 185,152.

*To all whom it may concern:*

Be it known that I, JOHN OAKLEY, a subject of the King of Great Britain, residing at Springfield, in the county of Hampden and State of Massachusetts, have invented a new and useful Broach, of which the following is a specification.

My invention relates to improvements in tools of the drift or broach type, which are employed to cut grooves in the bores of various objects, and consists of a body part which is round in cross section and has longitudinal and transverse clearance passages therein for the chips, and a plurality of inserted teeth, with means to secure such teeth in place, all as hereinafter set forth.

This invention is in the nature of an improvement of my broach covered by United States Letters Patent, No. 1,121,126.

The primary object of my invention is to produce a broach from which a broken or damaged tooth can easily and quickly be replaced, thus effecting a large saving in expense. Heretofore a broken or badly damaged tooth necessitated throwing away the whole broach, inasmuch as there is no way to repair or replace such a tooth in a broach having integral teeth.

Another object is to provide a broach with teeth that can readily and accurately be set with the required amount of projection of the cutting edges. This is a very important advantage, as will readily be seen, and one which saves time, labor, and expense.

Still another object is to provide a broach of this character with which any one of several practicable and efficient means can be employed to secure the teeth in place in the body or shank, such means also being of a nature to enable said teeth to be removed readily.

Other objects and advantages will appear in the course of the following description.

I attain the objects and secure the advantages of my invention by the means illustrated in the accompanying drawings, in which—

Figure 1 is a top plan of a broach which embodies a practical form of my invention; Fig. 2, a side elevation in partial section of said broach; Fig. 3, a left-hand or rear end elevation of the broach; Fig. 4, a front side elevation of one of the teeth; and Figs. 5, 6, 7, 8, and 9 are fragmentary sections of broaches which embody modifications of fastening or securing means for the teeth.

One of the teeth is omitted from Figs. 1 and 2 in order to show more clearly the manner in which the body or shank of the broach is constructed for the reception of the teeth therein.

Similar reference characters designate similar parts throughout the several views.

My broach comprises a body or shank 1, which is round in cross section, a plurality of separate or independent teeth 2 inserted therein, usually obliquely with the cutting end of each tooth nearer the front end of said shank, and securing means for said teeth. The shank 1 has a clearance passage 3 in advance of each tooth 2, and a longitudinal passage 4 opening through one side and the rear end of said shank, and into which said first-named passage opens at the bottom, substantially as shown.

Each tooth 2 is formed out of a piece of stock, which is round in cross section, by having one side planed off at 5 to produce the flat front side of the tooth, the top planed at a slight incline rearwardly and downwardly at 6 and cut down at 7—7 to produce the cutting portion of such tooth, such portion being designated by the numeral 8, and the bottom planed to correspond with the contiguous portions of the inner wall of the passage 4, as represented at 9. The side 5 of each tooth 2 is forward of the parallel, central plane of such tooth, so that sufficient stock is left adjacent to the edges of said side for bearing purposes and to enable the tooth to be reground when necessary. The sides 5 form the back sides of the passages 3 and determine the pitch of the teeth. The teeth may be reground until the aforesaid parallel, central plane is reached, which is a great advantage from an economical standpoint. The shoulders formed, by cutting down the top of each tooth 2 on both sides of the cutting portion 8 thereof at 7, are approximately flush with the contiguous parts of the shank 1. The teeth thus constructed are comparatively inexpensive in the first instance, and, as above intimated, can be very readily ground and reground, the regrinding or sharpening being repeated until the teeth are cut away on their sides 5 to such an extent that there is not sufficient stock left to hold them in place, so that the economy incident to the use of such teeth greatly augments the initial saving in cost.

The teeth 2 fit into openings 10 formed in the shank 1. Except in the Fig. 5 construction, the openings 10 extend from the outside of the shank 1 to the passage 4, and are oblique, if the position of the teeth 2 is to be oblique. Said openings are first bored or drilled and then slabbed off on their front sides to form the passages 3, or three sides of each of such passages. Each of the passages 3 is of less width than the diameter of its connecting opening 10, in order that there shall be sufficient stock on both sides and forward of the transverse, central, longitudinal plane of the tooth 2, which is received in such opening, to form ample abutments for such tooth.

The teeth 2 are so proportioned in length that, when properly set in the openings 10, the inclined face of the cutting portion 8, which is the exposed portion or that most remote from the axis of the shank 1, of each tooth 2, is a little higher or slightly more remote from such axis than is the corresponding face of the portion 8 of the next tooth 2 in front, the foremost, cutting-portion face being the lowest and the rearmost, cutting-portion face the highest. In other words, the cutting portion 8 of each tooth, from the shoulders 7 outward, is greater than that of the teeth in front. More or less departure from this arrangement may, however, be made, as will be apparent to one skilled in the art.

The provision of independent, separate, or individual teeth renders it very easy to set them expeditiously and in the most accurate manner in the shank, something that can not be done, of course, when the teeth are cut out of and integral with the shank, as will be very readily understood.

Various means may be employed for securing the teeth 2 in their openings 10, several of which I have illustrated and will now describe.

In the first three views transverse pins 11 are employed with which to hold the teeth 2 in place in the shank 1. These pins pass through the shank 1 on both sides of the teeth 2, in an axial plane of said shank that bisects the axial plane of said shank in which the longitudinal centers of said teeth are located, and through said teeth. Any or all of the pins 11 can be driven out and the teeth thus released, whenever it is desired to remove one or more of said teeth for regrinding or to have another or others substituted therefor.

In the Fig. 5 construction, teeth openings 12 are provided which do not extend through to the passage 4, and one or more shims 13 are introduced between the inner ends of said teeth and openings, wherever necessary, to give said teeth the necessary projection initially, and to compensate for the decrease in length due to regrinding. The passages 3 extend through to the passage 4 in this and in all cases.

A set-screw 14, on one or both sides of each tooth 2, is substituted in Fig. 6 for the pins 11, the position of the axis of such set-screw or set-screws corresponding generally with that of one of said pins. This is perhaps the preferred means for securing the teeth to the shank, because of the ease with which the removal of the teeth held by the set-screws 14 is effected, and of the facility with which the teeth can be set and adjusted. Another advantage of employing the set-screws is due to the fact that, in the event the teeth encounter an obstruction which ordinarily would break them, said teeth are forced inwardly into the passage 4, without serious damage being done, said set-screws not as a rule offering sufficient resistance at such a time to prevent the teeth from being so displaced. Each tooth 2 may be "spotted" or flattened, as at 15, where the inner ends of the set-screws 14 engage said tooth, to overcome any tendency that the tooth might have under stress to turn on its axis. To the same end the teeth in the preceding construction may be secured with set-screws, or they might be pinned to the shank as in the first example.

The Fig. 7 construction differs from the Fig. 6 construction only to the extent that the tooth 2 is recessed at 16 to receive the inner end of the set-screw 14. Here a single set-screw only is employed. This set-screw securely holds the tooth against both rotary and longitudinal movement.

In each of Figs. 8 and 9 a transverse, tapered pin 17 is employed for each tooth 2, such pin being driven into the shank 1 behind said tooth and so binding and holding the same in place. The pin 17 merely bears against the back side of the tooth without penetrating the same, in Fig. 8, although such tooth might be flattened a little at the place where said pin engages it, so that there would be less liability of axial movement on the part of the tooth, as in the case of the Fig. 6 construction. While in Fig. 9 the back of the tooth has a transverse groove 18 therein to receive the engaging part of the pin 17, displacement of the tooth in any direction being in this way entirely and positively prevented.

The proportions of the parts are such that the heads of the set-screws 14 and the ends of the pins 17 never extend beyond the exterior, adjacent surfaces of the shanks in which said set-screws and pins are inserted. And the ends of the pins 11 do not protrude from the shank 1.

The lateral passages 3, in front of the teeth 2, are wider than said teeth, so as to afford ample room for the chips made by the teeth to pass through to the longitudinal passage 4. The chips escape from the passage 4 either through the open side or rear end of said passage. To facilitate the passage of the chips from the passages 3 into the passage 4, the inner, front edges of the teeth 2 may be rounded off, as represented at 19 in Figs. 2 and 4. This does not apply to the Fig. 5 construction.

The shank 1 is provided at the front end with a threaded extension 20. Thus provision is made for attaching the broach to a threaded chuck. But the broach may be provided instead with a part which is adapted to be engaged by a jaw chuck, or said broach may be driven from the rear end. The manner and means of operating the broach is not material so far as the present invention is concerned.

The construction of the broach having been fully described, it is not necessary to explain the manner of operation of the broach, because such operation does not differ from that set forth in the hereinbefore-mentioned patent.

Changes in the shape and size of the parts of the broach, and minor structural changes besides those herein illustrated and described, may be made without departing from the spirit of my invention, provided the same do not exceed the scope of my claims.

It may not be out of place to call attention to the solid and substantial backing for the teeth which my construction affords. Such backing is ample to withstand the strain put upon the cutting edges of the teeth and transmitted to the shank and to those portions especially of the shank that are behind the upper portions of the teeth and behind each tooth as a whole.

What I claim as my invention, and desire to secure by Letters Patent, is—

1. As an improved article of manufacture, a broach comprising a shank provided with a plurality of openings for teeth, which openings have orifices at both ends, a plurality of teeth fitting such openings, said openings and teeth being in part cylindrical, and said teeth only partially filling said openings so that free passages are left for the chips, and means to retain said teeth in place in said openings.

2. As an improved article of manufacture, a broach comprising a shank provided with a plurality of openings for teeth, said openings having forward enlargements to form clearance passages, a plurality of teeth fitting such openings, said openings and teeth being in part cylindrical, and said teeth being flattened in front to form the rear walls of said passages, and means to fasten said teeth in place.

3. As an improved article of manufacture, a broach comprising a shank having therein a longitudinal clearance passage and transverse clearance passages opening into said first-named passage, and openings for teeth back of said second-named passages, teeth inserted in such openings, the front sides of said teeth forming the back sides of said second-named passages, and means to retain such teeth therein.

4. As an improved article of manufacture, a broach comprising a shank having therein transverse tooth openings, with front extensions from such openings to form clearance passages, teeth which are round in cross section to fit said openings, and flattened in front to form the back sides of said passages and determine the rake of said teeth, and shouldered on the sides at the top to form the cutting portions of said teeth, and means to retain said teeth in place in said openings.

5. As an improved article of manufacture, a broach comprising a shank which is round in cross-section and has a plurality of transverse tooth openings therein, such openings being in part cylindrical and having front extensions to form clearance passages, teeth which are cylindrical in part to fit said openings and form the back sides of said passages, and set-screws tapped into said shank to engage the rounded sides of said teeth and retain the teeth in place, and to release the teeth so that they can be taken from said shank, said set-screws being wholly within said shank.

6. A broach having separately formed teeth and having lateral passages extending along the forward faces of said teeth and a longitudinal passage communicating with the rear ends of said lateral passages.

JOHN OAKLEY.

Witnesses:
F. A. CUTTER,
A. C. FAIRBANKS.